(12) United States Patent
Kapustin et al.

(10) Patent No.: US 11,536,010 B2
(45) Date of Patent: Dec. 27, 2022

(54) ATMOSPHERIC WATER HARVESTER WITH CLIMATE-ADJUSTABLE ADSORBANT PROPERTIES

(71) Applicant: Water Harvesting, Inc., Newark, CA (US)

(72) Inventors: Ievgen Kapustin, Newark, CA (US); David S. Kuo, Newark, CA (US); Bruno Marchon, Newark, CA (US)

(73) Assignee: Water Harvesting, Inc., Newark, CA (US)

( * ) Notice: Subject to any disclaimer, the term of this patent is extended or adjusted under 35 U.S.C. 154(b) by 0 days.

(21) Appl. No.: 17/867,227

(22) Filed: Jul. 18, 2022

(65) Prior Publication Data
US 2022/0349158 A1 Nov. 3, 2022

Related U.S. Application Data

(63) Continuation of application No. PCT/US2022/012990, filed on Jan. 19, 2021.
(Continued)

(51) Int. Cl.
*E03B 3/28* (2006.01)
*B01D 53/26* (2006.01)
(Continued)

(52) U.S. Cl.
CPC ............ *E03B 3/28* (2013.01); *B01D 53/0446* (2013.01); *B01D 53/06* (2013.01); *B01D 53/261* (2013.01);
(Continued)

(58) Field of Classification Search
CPC ....... E03B 3/28; B01D 53/0446; B01D 53/06; B01D 53/261; B01D 2257/80; B01D 2259/4009
See application file for complete search history.

(56) References Cited

U.S. PATENT DOCUMENTS

| | | | |
|---|---|---|---|
| 5,565,139 | A | 10/1996 | Walker et al. |
| 5,632,802 | A | 5/1997 | Grgich et al. |

(Continued)

FOREIGN PATENT DOCUMENTS

| | | |
|---|---|---|
| GB | 2540798 A | 2/2017 |
| JP | S63-107720 A | 5/1988 |

(Continued)

OTHER PUBLICATIONS

PCT International Patent Application No. PCT/US22/12990, International Search Report and Written Opinion of the International Searching Authority dated Apr. 7, 2022, 14 pages.
(Continued)

*Primary Examiner* — Elizabeth J Martin
(74) *Attorney, Agent, or Firm* — Craig R. Miles; CR Miles P.C.

(57) ABSTRACT

Provided herein are atmospheric water harvesting systems that are tailored with an optimal adsorption threshold, based on energy cost and water availability considerations. The systems include a plurality of adsorbent modules, each containing metal organic frameworks of various adsorption thresholds. Such a design enables real time adjustment to achieve optimal harvesting conditions in changing atmospheric conditions, whether for daily or seasonal humidity variations.

17 Claims, 4 Drawing Sheets

Related U.S. Application Data

(60) Provisional application No. 63/139,211, filed on Jan. 19, 2021.

(51) Int. Cl.
 *B01D 53/04* (2006.01)
 *B01D 53/06* (2006.01)

(52) U.S. Cl.
 CPC .. *B01D 2257/80* (2013.01); *B01D 2259/4009* (2013.01)

(56) References Cited

U.S. PATENT DOCUMENTS

| | | |
|---|---|---|
| 6,684,648 B2 | 2/2004 | Faqih |
| 8,627,673 B2 | 1/2014 | Hill et al. |
| 9,446,969 B1 | 9/2016 | Redman et al. |
| 10,266,737 B2 | 4/2019 | Van Horn et al. |
| 2004/0107832 A1 | 6/2004 | Tongue et al. |
| 2005/0044862 A1 | 3/2005 | Vetrovec et al. |
| 2009/0151368 A1 | 6/2009 | Bar |
| 2011/0088552 A1 | 4/2011 | Ike et al. |
| 2012/0172612 A1 | 7/2012 | Yaghi et al. |
| 2013/0061752 A1 | 3/2013 | Farha et al. |
| 2013/0312451 A1 | 11/2013 | Max |
| 2014/0338425 A1 | 11/2014 | Kalbassi et al. |
| 2016/0030858 A1 | 2/2016 | Giacomini |
| 2017/0008915 A1 | 1/2017 | Yaghi et al. |
| 2017/0113184 A1 | 4/2017 | Eisenberger |
| 2017/0129307 A1 | 5/2017 | Zhou et al. |
| 2017/0354920 A1 | 12/2017 | Switzer et al. |
| 2018/0171604 A1 | 6/2018 | Kim et al. |
| 2018/0209123 A1 | 7/2018 | Bahrami et al. |
| 2019/0100903 A1 | 4/2019 | Panda et al. |
| 2019/0234053 A1 | 8/2019 | Kim et al. |
| 2020/0206679 A1 | 7/2020 | Stuckenberg |

FOREIGN PATENT DOCUMENTS

| | | | |
|---|---|---|---|
| WO | WO 2018/118377 A1 | 6/2018 | |
| WO | WO 2019/010102 A1 | 1/2019 | |
| WO | WO 2019/058158 A1 | 3/2019 | |
| WO | WO 2019/082000 A1 | 5/2019 | |
| WO | WO 2019/152962 A2 | 8/2019 | |
| WO | WO 2020/036905 A1 | 2/2020 | |
| WO | WO 2020/099561 A1 | 5/2020 | |
| WO | WO 2020/112899 A1 | 6/2020 | |
| WO | WO 2020/154427 A1 | 7/2020 | |
| WO | WO-2020154427 A1 * | 7/2020 | ............... C02F 1/14 |
| WO | WO 2021/034477 A1 | 2/2021 | |
| WO | WO 2021/067179 A1 | 4/2021 | |

OTHER PUBLICATIONS

U.S. Appl. No. 63/139,211, filed Jan. 19, 2021.
PCT International Patent Application No. PCT/US19/63442, International Search Report and Written Opinion of the International Searching Authority dated Jan. 22, 2020, 7 pages.
PCT International Patent Application No. PCT/US20/14647, International Search Report and Written Opinion of the International Searching Authority dated May 5, 2020, 11 pages.
PCT International Patent Application No. PCT/US20/53052, International Search Report and Written Opinion of the International Searching Authority dated Jan. 4, 2021, 10 pages.
PCT International Patent Application No. PCT/US21/16261, International Search Report and Written Opinion of the International Searching Authority dated Apr. 16, 2021, 8 pages.
PCT International Patent Application No. PCT/US21/47491, International Search Report and Written Opinion of the International Searching Authority dated Dec. 7, 2021, 9 pages.
PCT International Patent Application No. PCT/US22/26153, International Search Report and Written Opinion of the International Searching Authority dated Jul. 28, 2022, 18 pages.
Ding et al. Carbon capture and conversion using metal-organic frameworks and MOF-based materials. Chem. Soc. Rev., May 2019, 48(2):2783-2828.
Fracaroli et al. Metal-Organic Frameworks with Precisely Designed Interior for Carbon Dioxide Capture in the Presence of Water. Am. Chem. Soc., Jun. 2014, 136, pp. 8863-8866.
Furukawa et al. Water Adsorption in Porous Metal-Organic Frameworks and Related Materials. J. Am. Chem. Soc., Mar. 2014, 136(11): 4369-4381.
Hanikel et al. Rapid Cycling and Exceptional Yield in a Metal-Organic Frameworks for Water Harvester. ACS Cent. Sci., Aug. 2019, 5(10):1699-1706.
Kalmutzki et al. Metal-Organic Frameworks for Water Harvesting from Air; Adv. Mater. Sep. 2018, 30(37):1704304.
Kim et al. Water harvesting from air with metal-organic frameworks powered by natural sunlight. Science, Apr. 2017, 356:430-434.
Kummer et al. A functional full-scale heat exchanger coated with aluminum fumarate metal-organic framework for adsorption heat transformation. Ind. Eng. Chem. Res., Jul. 2017, 56(29):8393-8398.
Li et al. Incorporation of Alkylamine into Metal-Organic Frameworks through a Brønsted Acid-Base Reaction for CO2 Capture. ChemSusChem., Oct. 2016, 9(19):2832-2840.
Tu et al. Progress and Expectation of Atmospheric Water Harvesting. Joule, Aug. 2018, 2(8):1452-1478.
Zhou et al. Atmospheric Water Harvesting: A Review of Material and Structural Designs. ACS Materials Lett., May 2020, 2(7):671-684.

* cited by examiner

ATMOSPHERIC WATER HARVESTER WITH CLIMATE-ADJUSTABLE ADSORBANT PROPERTIES

CROSS-REFERENCE TO RELATED APPLICATION

This United States Patent Application is a continuation of International Patent Cooperation Treaty Patent Application No. PCT/US2022/012990, filed Jan. 19, 2022, which claims the benefit of U.S. Provisional Patent Application No. 63/139,211, filed Jan. 19, 2021, each hereby incorporated by reference herein.

FIELD

The present disclosure relates generally to water harvesting, and more specifically to systems and methods for harvesting water from surrounding air in changing atmospheric conditions.

BACKGROUND

Drinking water is scarce, especially in desert areas of North Africa and the Middle East. However, it is plentiful in the atmosphere, even in dry regions. In the last few years, atmospheric water harvesting using, porous materials have been devised. See Atmospheric Water Harvesting: A Review of Material and Structural Designs, X. Zhou, H. Lu, F. Zhao, and G. Yu, ACS Materials Lett. 2020, 2, 7, 671-684. In particular, a class of metal organic frameworks (MOFs) with high water affinity has been developed that exhibits superior atmospheric water production. See H. Furukawa, F. Gándara, Y. B. Zhang, J. Jiang, W. L. Queen, M. R. Hudson, and O. M. Yaghi, *Water Adsorption in Porous Metal-Organic Frameworks and Related Materials*, J. Am. Chem. Soc. 2014, 136, 11, 4369-4381; M. J. Kalmutzki C. S. Diercks, and O. M. Yaghi, *Metal-Organic Frameworks for Water Harvesting from Air*, Advanced Materials Volume 30, Issue 37, 2018, 1704304; and N. Hanikel et al., *Rapid Cycling and Exceptional Yield in a Metal-Organic Framework Water Harvester*; ACS Cent. Sci. 2019, 5, 10, 1699-1706, Aug. 27, 2019. This discovery has spurred the development of devices that could be deployed in the home, or in desert areas where no drinking water is available. See WO 2020/154427.

Depicted in FIG. 1 is a schematic of the water adsorption properties of various porous materials. The amount of water adsorbed (in mass %) is typically represented as a function of the relative humidity (in %) of the surrounding air in what is referred to as an adsorption isotherm. To first order and for all practical purposes, these curves are independent of temperature. MOF materials exhibit a step-like characteristic, which lets them capture and release water in a very narrow range of humidity (FIG. 2). This is in contrast with more conventional materials such as silica gel that exhibit a much more gradual isotherm, or zeolites that only desorb water at extremely low humidity levels (FIG. 1). Another advantage of MOF material is that the relative humidity $RH_0$ where adsorption occurs (adsorption threshold) can be adjusted by changing the molecular characteristics of the material itself. In fact, a continuous range of $RH_0$ can be obtained by mixing various organic or inorganic constituents into multivariational MOFs of different water affinity. See WO2020112899; Janiak, C. et al. Solid-Solution Mixed-Linker Synthesis of Isoreticular Al-Based MOFs for an Easy Hydrophilicity Tuning in Water-Sorption Heat Transformations *Chem. Mater.* 2019, 31, 11, 4051-4062; and Fang, Y. et al. One-Pot Synthesis of Two-Linker Mixed Al-Based Metal—Organic Frameworks for Modulated Water Vapor Adsorption *Cryst. Growth Des.* 2020, 20, 10, 6565-6572. Finally, a large adsorption capacity in mass % is also a requirement for a practical water harvester.

What is needed in the art are atmospheric water harvesters designed for optimal harvesting conditions in changing atmospheric conditions.

BRIEF SUMMARY

In some aspects, an atmospheric water harvesting system includes: a plurality of modules arranged into at least one adsorption stack; a desorption chamber, configured to receive a module saturated or nearly saturated with water from an adsorption stack, and cause desorption of water from the module positioned therein in the form of water vapor; a condensation chamber, positioned adjacent to or near the desorption chamber, and configured to condense at least a portion of the water vapor from the desorption chamber into liquid water; and a robotic arm, configured to (i) select and grasp a module in an adsorption stack that is saturated or nearly saturated with water, and (ii) transfer the module into the desorption chamber. In some embodiments, each module independently includes at least one metal organic framework positioned on or incorporated into a support. In some variations, at least one metal organic framework adsorbs water from surrounding air when the module is positioned within an adsorption stack.

In certain aspects, provided is also a method of harvesting water from the atmosphere using any of the atmospheric water harvesting systems described herein.

DESCRIPTION OF THE FIGURES

The present application can be best understood by reference to the following description taken in conjunction with the accompanying figures included in the specification.

DETAILED DESCRIPTION

Figure 1:
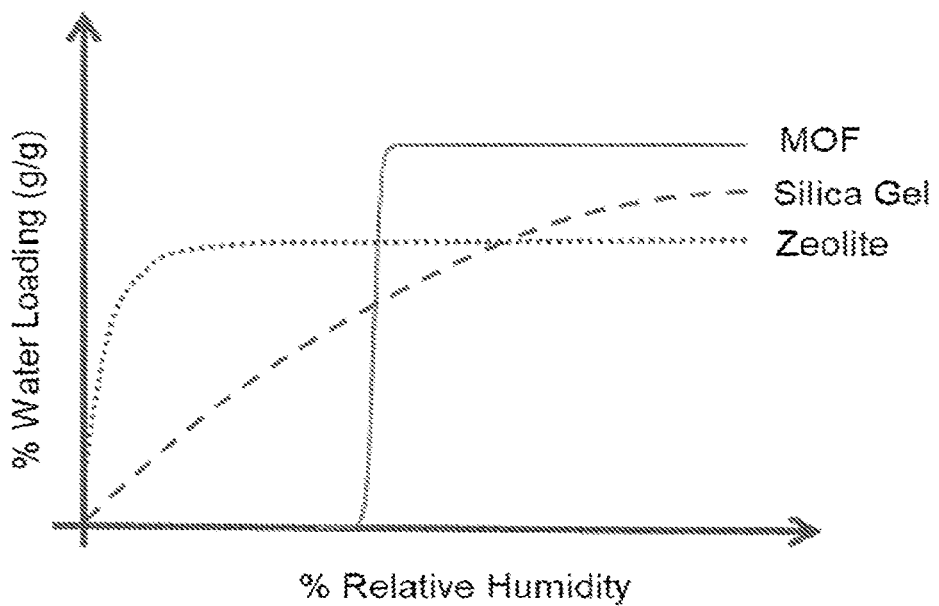
FIG. 1 depicts a graph comparing adsorption isotherms of MOF with conventional adsorbents such as silica gel and zeolite.

The following description sets forth exemplary systems, methods, parameters and the like. It should be recognized, however, that such description is not intended as a limitation on the scope of the present disclosure but is instead provided as a description of exemplary embodiments.

In some aspects, provided are atmospheric water harvesters that include a MOF adsorbent system with an optimal adsorption threshold, based on energy cost and water availability considerations. Provided are also methods of harvesting water from surrounding air using the atmospheric water harvesters described herein. In some embodiments, the design of the atmospheric water harvesters include several adsorbent assemblies, each made with MOF of various adsorption thresholds. Such harvesters allow for a real time adjustment of the MOF material for optimal harvesting conditions in changing atmospheric conditions, whether for daily or seasonal humidity variations. In some embodiments, the atmospheric water harvester is configured such that the adsorption process is fully separated from the desorption and condensation processes. This allows for multiple design configurations.

In one aspect, provided is an atmospheric water harvesting system comprising a plurality of MOF modules; a desorption chamber, a condensation chamber, and a robotic arm. Each MOF module contains at least one MOF. In some embodiments, the MOF modules are arranged into an adsorption stack. The adsorption stack can contain either MOF modules of the same MOF material (MOF "A") or MOF modules with the MOF material of different adsorption threshold $RH_0$ (MOF "A", "B", "C" etc.).

In some variations, the MOF comprises organic ligands having acid and/or amine functional group(s). In certain variations, the organic ligands have carboxylic acid groups. In other variations, the organic ligands have acid and/or amine functional group(s). In certain variations, the organic ligands have carboxylic acid groups. Any suitable MOFs capable of adsorbing and desorbing water may be employed in the systems provided herein. Suitable MOFs may include those described in, for example, Kalmutzki et al., Adv. Mat., 30(37), 1704304 (2018); Furukawa et al., J. Am. Chem. Soc. 2014, 136, 4369-4381; Y. Tuet al, Joule, Vol 2, issue 8(15), 1452-1475 (2018). In some variations, the MOF is: MOF-303: Al(OH)(HPDC), where HPDC is 1H-pyrazole-3,5-dicarboxylate; CAU-10: Al(OH)(IPA), where IPA is isophthalate; MOF-801: $Zr_6O_4(OH)_4(fumarate)_6$; MOF-841: $Zr_6O_4(OH)_4(MTB)_6(HCOO)_4(H_2O)_2$; Aluminum Fumarate: Al(OH)(fumarate); MIL-160: Al(OH)(FDA), where FDA is 2,5-furandicarboxylate; MIL-53: Al(OH)(TPA), where TPA is terephthalate; or Aluminum Phosphate: AlPO4-LTA. In some variations, the MOFs have pore sizes between about 0.5 nm about 1 nm, or between about 0.7 nm to about 0.9 nm. In certain variations, the MOFs have a hydrophilic pore structure. In certain variations, the MOFs have a hydrophilic pore structure comprising acid and/or amine functional groups. In certain variations, the MOFs have 1D channels that allow for reversible water adsorption. Any combinations of the MOFs described herein may also be used. In some embodiments, the MOF is mixed with a binder to improve its properties for adhesion to a substrate or support.

Air is blown across the MOF modules, which are configured in such a way as to maximize its surface to volume ratio for rapid humidity exchange with the air. For example, in some variations, the MOF modules contain uniform layers of MOF coated on parallel plates. Water is adsorbed when the ambient relative humidity $RH_{amb}$ is larger than the adsorption threshold $RH_0$ see FIG. 2), and adsorption rate $R_{ads}$ can be expressed as:

$$R_{ads} \sim S(T_{amb}) \times (RH_{amb} - RH_0) \qquad \text{Eq(1)}$$

where S(T) is the water saturation vapor pressure at temperature T, and $T_{amb}$ is the temperature of the ambient air. Adsorption rate directly affects water productivity (e.g. in liter per day, see FIG. 3).

The robotic arm (automation system) is configured to select and pick up the optimal MOF module based on the weather conditions. The robotic arm selects and grasps a MOF module from the adsorption stack after saturation (or near saturation) with water, and transfers such MOF module to the desorption chamber. The robotic arm replaces the MOF module after it is desorbed, grasping the desorbed MOF module from the desorption chamber and placing it back into the adsorption stack to reach saturation.

In some variations, the robotic arm includes robotic effectors, vacuum effectors, mechanical effectors, or electromechanical effectors. In certain variations, robotic end effectors may include flexible structures that may be manipulated between various orientations. For example, in one variation, the structures may include silicon bodies or other flexible material. In certain variations, vacuum end effectors may grasp items using suction. In other variations, mechanical or electromechanical end effectors may include pinchers, claws, grippers, or other rigid components that may be actuated relative to one another for grasping an item.

Figure 2:
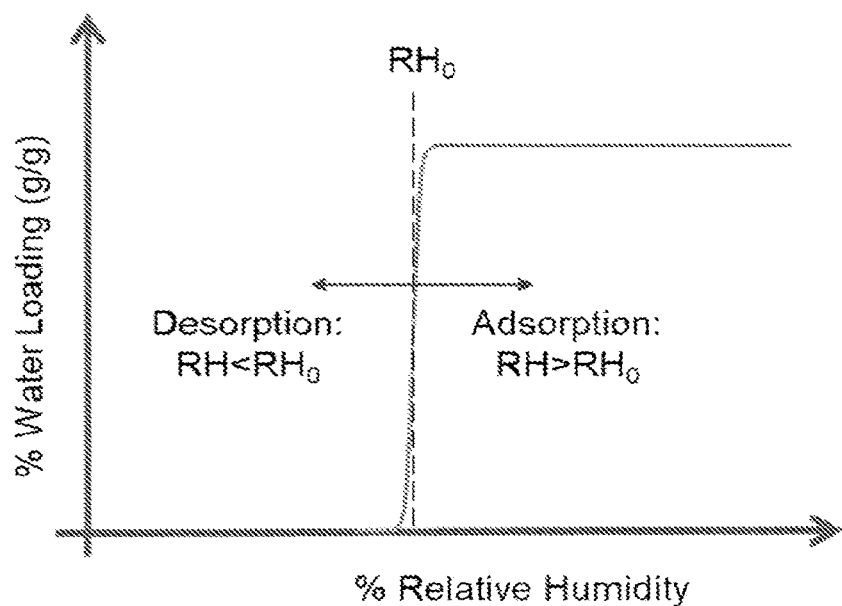
FIG. 2 depicts a graph showing adsorption and desorption in the context of atmospheric water harvesting using MOFs.

To get the water out of a MOF module that is saturated or nearly saturated with water, the robotic arm transfers the selected MOF module to the desorption chamber. In the desorption chamber, the humidity in the MOF module needs to be brought below $RH_0$ (FIG. 2). In some variations, this may be accomplished by elevating the air temperature, which raises the water saturation vapor pressure S(T), hence decreasing the relative humidity. The temperature $T_{des}$ at which water starts to desorb can be calculated using the following equation:

$$S(T_{des}) \times RH_0 = S(T_{amb}) \times RH_{amb} \qquad \text{Eq(2)}$$

Equation (2) states that the absolute humidity (or water vapor concentration) is conserved during heating from $T_{amb}$ to $T_{des}$. In addition to the adsorption energy $E_{ads}$ required to desorb the water from the MOF, there is an energy cost $E_s$ also associated with raising the temperature (sensible energy). $E_s$ directly scales with desorption temperature, and an example of the variation of $E_s$ vs $RH_0$ is shown schematically in FIG. 3.

As temperature is raised, a small flow of air allows the desorbing moisture to get transferred to a condensation chamber housing at least one condenser. Once moist air arrives to the condenser, the liquid water condenses and is collected. In some variations, the moist air encounters a series of cold plates, arranged to maximize surface area, allowing the liquid water to condense.

Figure 4:
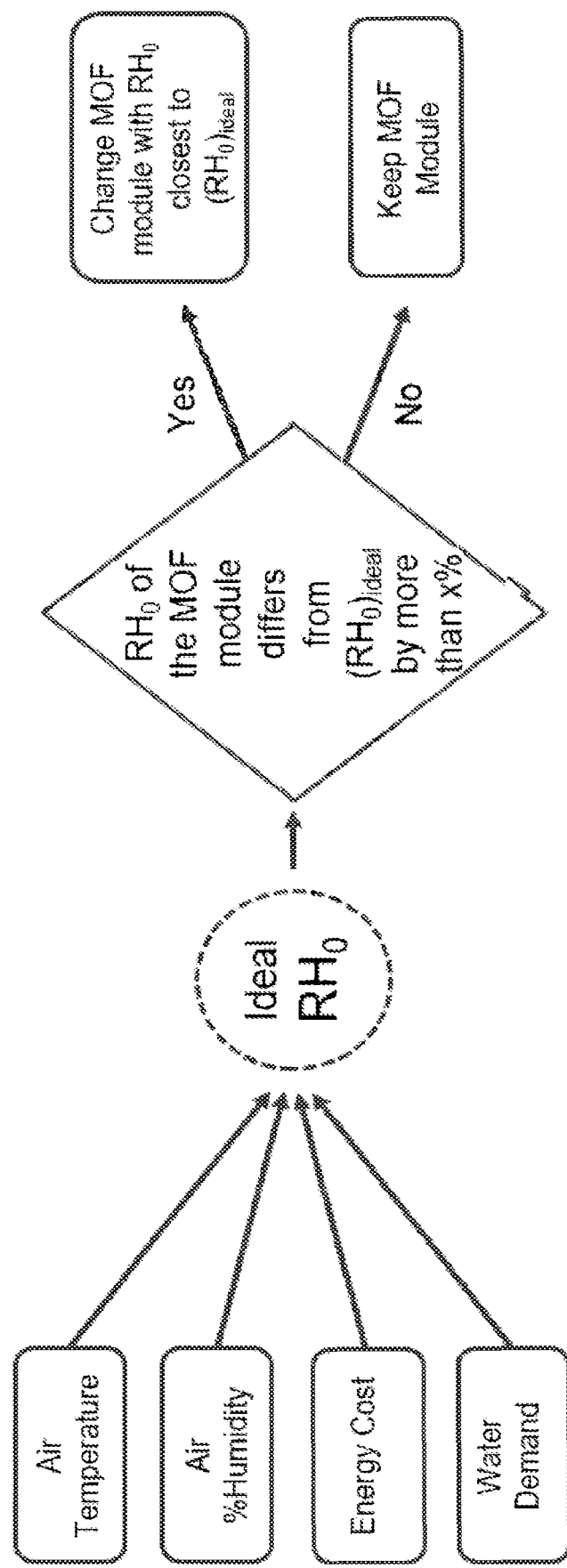
FIG. 4 depicts a decision tree for selecting the optimal type of MOF module to be moved to the desorption or condensation chambers

FIG. 4 illustrates the process by which a control system will select the optimal MOF module for the robotic arm to pick up. The system keeps track of the adsorption process to ensure that the modules have reached sufficient adsorption state before being selected for the desorption or condensation process. Based on the weather condition, the system will further pick the optimal type of MOF module to be moved to the desorption or condensation chambers, according to the decision tree shown in FIG. 4 (the algorithm that defines $(RH_0)_{ideal}$, and the value of x % are user defined). For example, in a high relative humidity environment and when the water demand is not too severe, a MOF with high $RH_0$ can be selected to save on energy cost. Conversely, a low $RH_0$MOF module can be selected when the environment relative humidity is low.

Figure 5A:
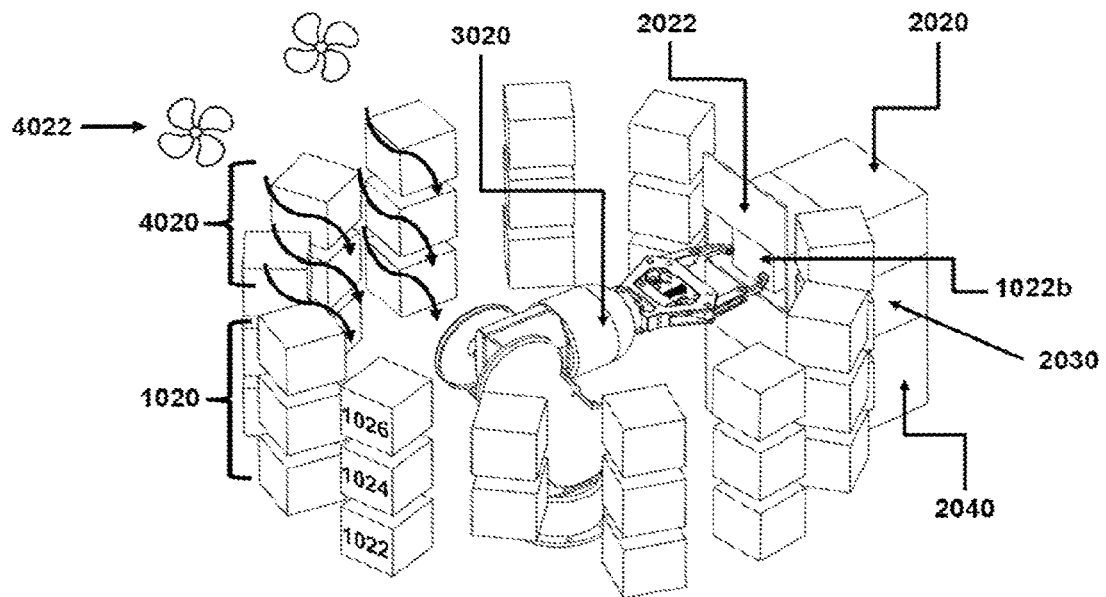
FIG. 5A depicts an exemplary atmospheric water harvesting system with changeable MOF modules in a circular configuration.
Figure 5B:
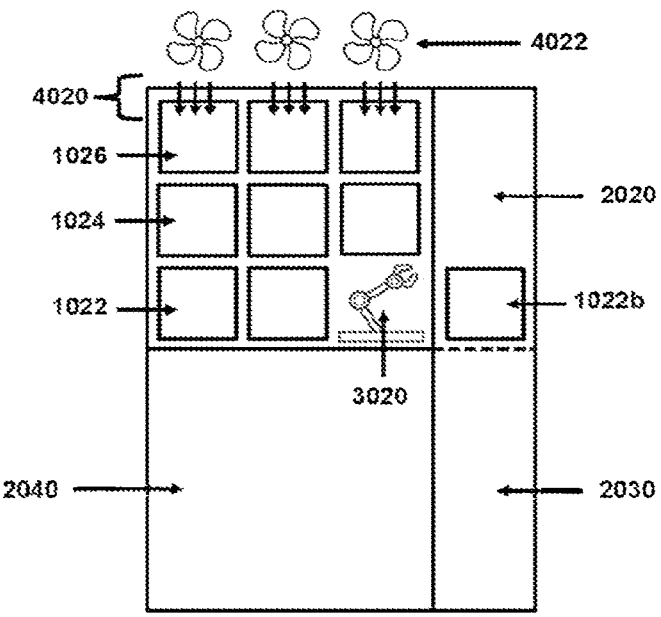
FIG. 5B depicts an exemplary atmospheric water harvesting system with changeable MOF modules in a stacked configuration.

With reference to FIGS. 5A & 5B, exemplary atmospheric water harvesting systems are depicted. These figures show systems where the adsorption process is fully separated from the desorption and condensation processes. FIG. 5A depicts a circular configuration with stacks of MOF modules 1020, arranged radially with desorption chamber 2020, condensation chamber 2030 and water collection tank 2040 and central automated material handler 3020 (a robotic arm in this example). As depicted in this exemplary embodiment of the system, adsorption stack 1020 includes MOF modules containing MOF material of different adsorption thresholds $RH_0$. As depicted in the figure, MOF module 1022 is an adsorbing module, and modules 1024 and 1026 are depicted in idle mode. The MOF modules sit in pre-arranged adsorption stack 1020 with air flow 4020 controlled by airflow management system 4022 (adsorption fans in this example) to optimize the adsorption process. Once desorbing MOF module 1022b is selected by the system, robotic arm 3020 will pick it up and place it in desorption chamber 2020 where water is desorbed using heat. Desorption chamber 2020 includes gate 2022 that opens in order to receive desorbing MOF module 1022b transferred by the robotic arm 3020 from an adsorption stack and close after the MOF module undergoes desorption. The resulting steam is then guided to the condensation chamber 2030 where liquid water is produced and collected into the water tank 2040. Once desorption is complete, the robotic arm will transfer this MOF module from the desorption chamber back to its original position in the adsorption stack. The next MOF module will then be picked up by the robotic arm and placed into desorption chamber 2020 for desorption, and the process continues. FIG. 5A shows a circular configuration, but multiple geometries can be used according to space and footprint conditions. FIG. 5B for instance shows a similar concept, but in a stacked configuration.

With reference again to FIG. 3, the value of $RH_0$ has a direct effect on both adsorption and desorption efficiencies. During adsorption, the rate of water capture scales with $(RH_{amb}-RH_0)$, as shown on Equation (1) above. Hence, for a given location/climate, a lower adsorption threshold enhances adsorption kinetics and water productivity. During desorption, however, the MOF modules (which may include, for example, MOF material and support) needs to be heated up in order to bring the relative humidity back below $RH_0$ (FIG. 2), and here a low adsorption threshold will require more thermal energy.

Figure 3:
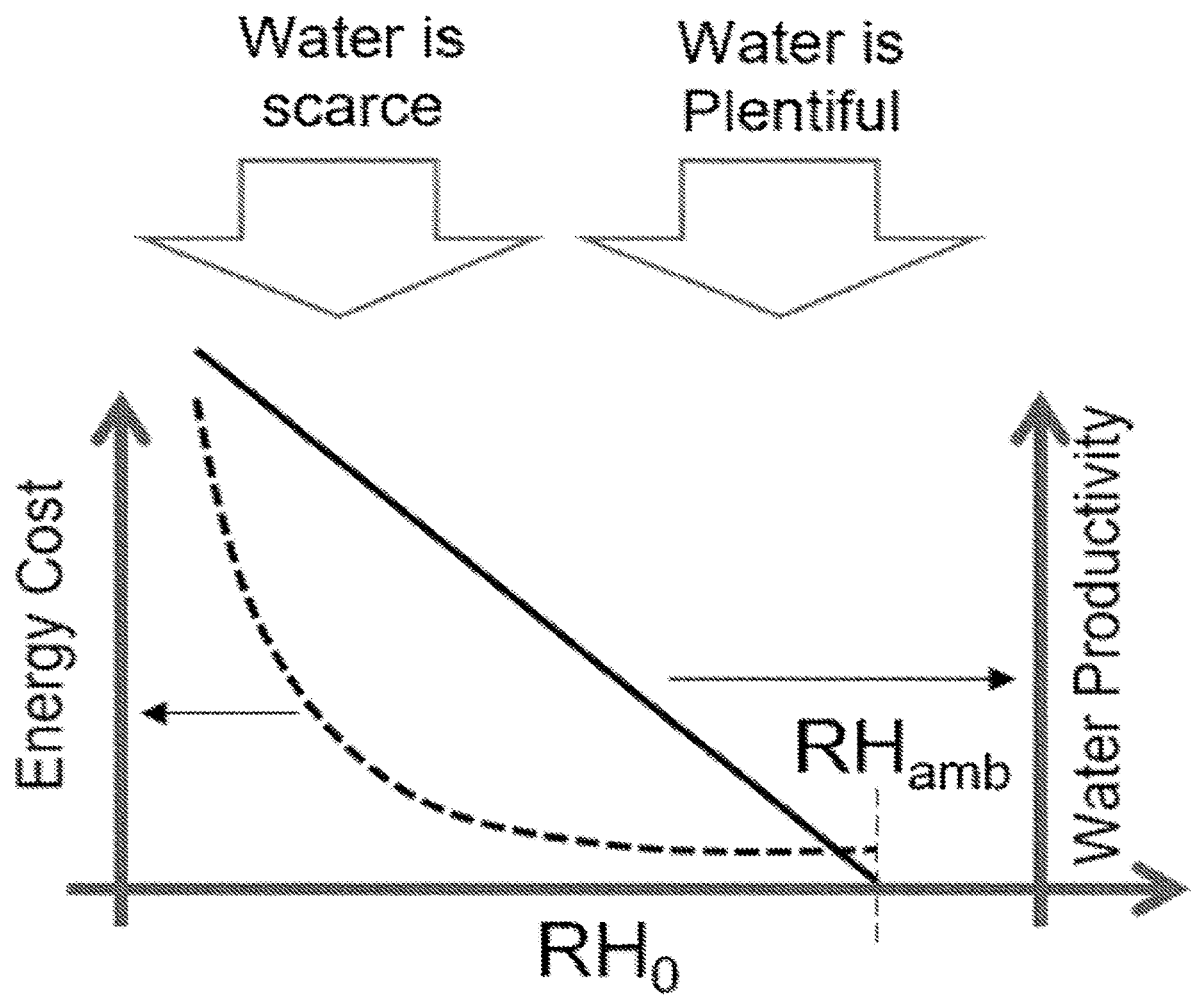
FIG. 3 depicts a graph showing optimization of water harvesting, in terms of productivity as compared to energy cost.

FIG. 3 graphically illustrates the choice to make when designing a MOF-based water harvester. In dry climates, where relative humidity $RH_{amb}$ of the ambient air is low, then the MOF material needs to have a low adsorption threshold $RH_0$ in order to capture water. However, when relative humidity is high, then the user has a choice between a lower energetic cost at the expense of water productivity (high $RH_0$), or a high water productivity at the expense of energetic cost (low $RH_0$). For instance, when water reserves are plentiful, the choice of a lower energy cost would be made, but when water is in high demand, a MOF with lower $RH_0$ will be preferred. Examples of this type of situation could be the daily variation of humidity in dry areas where lower temperatures during the night result in higher relative humidity. Also, annual humidity variation between seasons in a given area might also benefit from an adjustment of the MOF adsorption threshold.

What is claimed is:

1. An atmospheric water harvesting system, comprising:
   a plurality of modules arranged into an adsorption stack, wherein each module independently comprises a metal organic framework positioned on or incorporated into a support, and wherein said metal organic framework adsorbs water from surrounding air when positioned within said adsorption stack;
   a desorption chamber, configured to receive a module saturated or nearly saturated with said water from said adsorption stack, and cause desorption of water from said module as water vapor;
   a condensation chamber, positioned adjacent to or near said desorption chamber, and configured to condense at least a portion of said water vapor from said desorption chamber into liquid water; and
   a robotic arm, configured to (i) select and grasp said module in said adsorption stack, and (ii) transfer said module into said desorption chamber.

2. The system of claim 1, further comprising a water collection tank, positioned adjacent to or near said condensation chamber.

3. The system of claim 1, wherein same said metal organic framework contained in each of said plurality of modules.

4. The system of claim 1, wherein said metal organic framework contained in at least a portion of said plurality of modules comprise metal organic framework having a different adsorption thresholds.

5. The system of claim 1, wherein, in each said module, said support comprises one or more plates, wherein each of said one or more plates independently coated on one or both sides with said metal organic framework, and wherein a plurality of plates disposed parallel to each other with a gap between adjacent ones of said plurality of plates.

6. The system of claim 5, wherein both sides of each of said one or more plates includes a coat of said metal organic framework.

7. The system of claim 1, wherein said desorption chamber comprises a heat exchange elements configured to heat said module, thereby causing desorption of said water absorbed by said metal organic framework.

8. The system of claim 1, further comprising a gate disposed in said desorption chamber, wherein said desorption chamber configured to (i) open said gate to receive a said module transferred by said robotic arm from said adsorption stack, (ii) close said gate after said module is positioned within said desorption chamber and while said module undergoes desorption, and (iii) open said gate after said module undergoes desorption.

9. The system of claim 1, wherein said condensation chamber comprises at least one condenser.

10. The system of claim 1, wherein said robotic arm comprises one or more of: robotic effectors, vacuum effectors, mechanical effectors, and electromechanical effectors.

11. The system of claim 1, wherein said robotic arm comprises one or more of: pinchers, claws, and grippers, configured to grasp said module.

12. The system of claim 1, further comprising:
    a control system, configured to (i) monitor and control adsorption, desorption and condensation, and (ii) instructing said robotic arm to select, grasp and transfer said module, wherein the control system comprises at least one sensor, and at least one processor unit.

13. The system of claim 12, wherein said control system is configured to:
    generate a grasping strategy in said system based on at least one of (i) relative humidity of said surrounding air, (ii) adsorption thresholds of said module, (iii) energy cost associated with desorption, and (iv) level of water reserves; and
    instruct said robotic arm to perform said grasping strategy in selecting said module to grasp from said adsorbent stack and transfer said module to said desorption chamber.

14. The system of claim 1, further comprising a power source.

15. The system of claim 1, further comprising photovoltaic cells or passive solar captors, or a combination thereof.

16. The system of claim 1, further comprising an airflow management system configured to move atmospheric air across one or more of said plurality of modules in said adsorption stack.

17. The system of claim 16, wherein said airflow management comprises at least one fan.

* * * * *